Feb. 25, 1936.  E. L. BOWLES  2,031,924
METHOD AND MEANS FOR MEASURING DYNAMIC CHARACTERISTICS
Filed Aug. 15, 1928
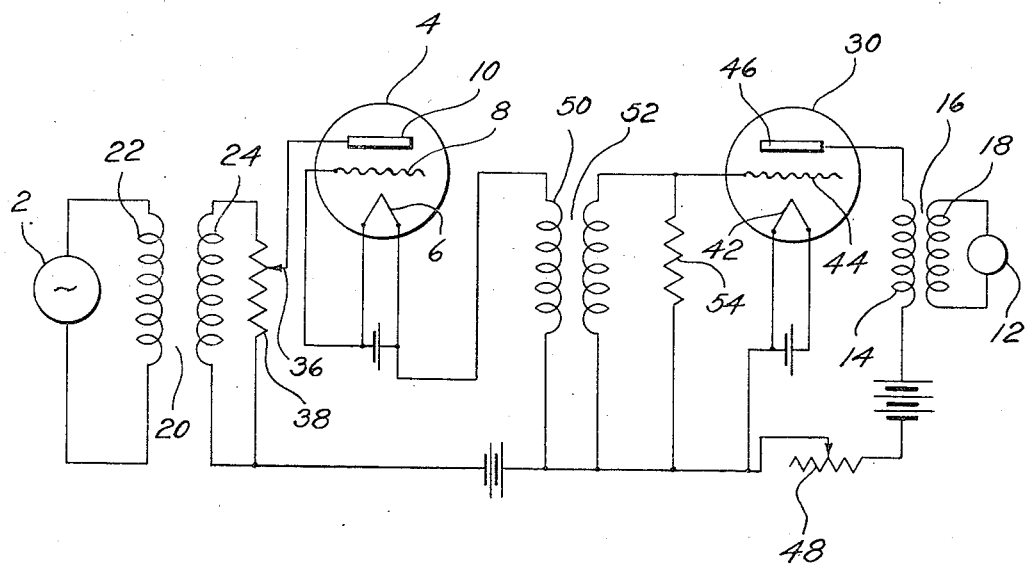
Inventor
Edward L. Bowles
By David Rines
Attorney Patented Feb. 25, 1936

2,031,924

UNITED STATES PATENT OFFICE 2,031,924

METHOD AND MEANS FOR MEASURING DYNAMIC CHARACTERISTICS

Edward Lindley Bowles, Wellesley Farms, Mass.

Application August 15, 1928, Serial No. 299,695

27 Claims. (Cl. 250—27)

The present invention relates to electric meters. The invention is more particularly concerned with the measurement of the dynamic characteristics, such as the dynamic internal plate resistance $r_p$, or other dynamic internal resistance of space-current devices, like vacuum tubes, and other electric instruments. The present application is a continuation in part of application Serial No. 171,238, filed February 26, 1927.

The said dynamic characteristics, such as the internal plate resistance $r_p$ of a three-electrode vacuum tube, as is well known, are differential functions of the plate and grid voltages and the plate current of the tube. They are obtainable from the static curves of the appropriate quantities, but very awkwardly and inaccurately, involving manual adjustment of direct-current resistances or other devices and interpretation of instrumental variations of current. The dynamic internal plate resistance is given as the slope of the plate-voltage, plate-current characteristic of a vacuum tube (when plate volts are plotted as the ordinates) and, therefore, applies to any region of that characteristic, no matter what the curvature, or the rate of change of the slope. The alternating measuring voltage must necessarily, therefore, be small enough so that the current response resulting from this voltage is proportional to the voltage. Should the voltage be too large, this relationship between cause and effect would not be linear and the response would, therefore, not be a true indication of the desired dynamic coefficient. It is a recognized fact, in other words, that, in measuring any dynamic-tube coefficient, the alternating, measuring voltage must be so small that no appreciable harmonics are produced (due to the curvature of the characteristic). These harmonics amount to by-products which vitiate the results sought.

A chief object of the present invention is to provide an improved method of, and apparatus for, measuring, by a simple, direct-indicating scheme, these dynamic characteristics, such as the dynamic internal plate resistance, $r_p$. Other objects will be explained hereinafter, and will be particularly pointed out in the appended claims, it being understood that it is intended to express in the claims all the novelty that the invention may possess.

The invention will be explained in connection with the accompanying drawing, the single figure of which is a diagrammatic view of circuits and apparatus constructed and arranged in accordance with a preferred embodiment of the present invention.

To fix the ideas, let it be assumed that it is desired to measure the dynamic internal plate resistance of each of a plurality of vacuum tubes 4, each having a plurality of electrodes, namely, a filament 6, a grid 8 and a plate 10. Though the description will proceed upon the basis that a particular tube 4 is had in mind, it will also be apparent that any number of such tubes or other devices may be connected in and out of circuit, one after another, for the purposes of measurement.

The tube 4 is connected with a source of alternating voltage 2, either directly or, preferably, through a transformer 20. The primary winding 22 of the transformer 20 is connected in circuit with the source 2, and the secondary winding 24 is connected in the plate or output circuit of the tube 4. The secondary winding 24 is shown shunted by a resistor or voltage divider 38. The output circuit of the tube 4 is coupled to the input circuit of an amplifier 30 having a filament 42, a grid 44 and a plate 46. Several stages of amplification may be employed, if preferred but the amplifier is common to all the tubes 4 to be tested. The coupling may be effected in any suitable manner, preferably, as shown, through a transformer 52, the primary winding 50 of which is disposed in the output circuit of the tube 4, in series with the secondary winding 24 of the transformer 20.

Current from the output circuit of the tube 4 will be transmitted to the amplifier 30 by the transformer 52, and the alternating voltage thus produced in the plate circuit of the tube 30 will be transmitted through a transformer 16 to an alternating-current indicating instrument 12, such as a galvanometer. The primary winding 14 of the transformer 16 is connected in the output circuit of the amplifier 30 and the secondary winding 18 is connected with the meter 12. If the amplifier 30 be replaced by a detector tube, a direct-current instrument 12 may be inserted, instead, directly in the output circuit of the detector tube 30. In both cases, however, the dynamic internal plate resistance or other dynamic characteristics may be read off directly from the instrument, as will be explained.

The dynamic internal plate resistance may be measured, according to the present invention, in a number of ways. Several ways will be described herein, and others will readily suggest themselves to persons skilled in the art.

It will first be assumed that a definite, constant voltage is impressed upon the output circuits of all tubes 4 under test when they are successively connected with their common input circuit and their common output circuit before described. This may readily be brought about by adjusting the slider 36 along the voltage divider 38 which is traversed by a constant alternating current. This can be conveniently accomplished, for example, by making the resistance of the resistor 38 small compared with the dynamic internal plate resistance of the tube 4 under test. With a constant impressed voltage for all tubes 4 under test, the current of the output circuit of the tube 4 will, of course, for practical purposes be inversely proportional to the total impedance of the output circuit. As all other resistances of the output circuit are preferably made exceedingly small compared to the internal plate resistance, the current in the output circuit, which is proportional to the voltage in the output circuit of the said tube 4 will, therefore, for practical purposes, be inversely proportional to the internal plate resistance. This facilitates reading direct values of the dynamic characteristics upon the alternating current indicating instrument 12; for when different tubes 4, having different dynamic characteristics such as internal plate resistances, are connected into circuit, the meter 12 will indicate the individual internal plate resistances or other dynamic characteristics if the circuit is properly adjusted by different deflections. As the deflection of the meter 12 will be proportional to the dynamic internal plate resistances of different tubes 4, the values of the dynamic internal plate resistances of these different tubes may, thus, be read directly upon the meter 12, assuming the impedances of the common input and output circuits to be substantially constant. With proper calibration of the meter 12, therefore, it is possible to measure an alternating current impulse independent of the source 2 of voltage and as a direct indication of the dynamic characteristic desired.

It is not, however, essential that the other resistances associated with the internal plate resistance be negligible in comparison therewith. In fact, it may be desirable, under some conditions, so to arrange the circuits that the impedance, looking into the winding 50 of the transformer 52, shall not be negligible compared with the internal plate resistance of the tube 4. Thus, if the impedance looking into the transformer 52 were of the same order of magnitude as the internal plate resistance of the tube 4, the only effect would be to cause a different calibration of the scale of the instrument 12.

In addition to the variable resistor 48, which is used as before described, a resistor 54 may be employed, connected between the grid 44 and the filament 42. The resistance of the resistor 54 should be of such value that the internal impedance from the grid 44 to the filament 42 is large by comparison. This decreases the effect of the internal input impedances of different amplifiers 30, with the result that the amplifier tube 30 may then be replaced by another amplifier without upsetting the characteristics of the indicating instrument due to a change in the impedance in the circuits shown to the right of the transformer 52. Furthermore, since different tubes of the same type may have dynamic characteristics such as amplification coefficients and internal plate resistances of different values, the use of different tubes 30 will introduce variations in the readings of the meter 12 for the same, constant voltage applied to the tube 4, notwithstanding the use of a common input circuit and a common output circuit for the amplifier 30 with substantially constant impedances in the common amplifier input and output circuits. A variable resistor 48 may, therefore be inserted in the output circuit of the amplifier 30 to compensate for such differences, and so as to give the same reading in the meter 12, notwithstanding the fact that different amplifiers 30 may be employed.

In the operation of the system, as thus far explained, a calibrated tube 4, having a definite, known, dynamic characteristic, is first inserted in the first stage of the device. As the dynamic characteristics of the amplifier tube 30 are not known, the resistor 48 is adjusted until the indicating meter 12 reads the value of the amplification coefficient equal to that of the calibrated tube 4. The device is now ready for the measurement of the dynamic characteristics of various tubes 4, and the meter 12 will indicate such dynamic characteristics directly.

According to the disclosure in application Serial No. 561,405, however, it is possible to calibrate the device, and thus effect these dynamic characteristic measurements, even though the first tube 4 is not previously calibrated, so that its dynamic characteristic is not previously known.

The use of a constant impressed voltage in the output circuit of the tube 4 is not, however, essential. In accordance with a second way of measuring the internal plate resistance, the voltage divider 38, instead of the meter 12, may be calibrated in terms of the internal plate resistance. The position of the slider 36, and not the indicating needle of the meter 12, would then indicate directly the internal plate resistance of the tube 4. The calibration of the voltage divider may be effected in many ways within the scope of the invention. Thus, to start with, a calibrated tube 4 having a definite, known internal plate resistance or other dynamic characteristic, could be first inserted in the first stage of the device, and the slide wire 36 could then be adjusted to yield a definite deflection on the meter 12. The position of the slide wire 36 would then indicate the value of the internal plate resistance of that particular tube 4. Various known resistances could then be inserted in series with the said known tube 4, and the slide wire 36 adjusted so as always to give the same deflection on the meter 12. These adjusted positions of the slide wire would correspond to calibrations of the voltage divider 38. Of course, if the internal impedance of the tube 4 dominates, it will only be necessary to check the deflection of the meter by the insertion of one known resistor since the position of the slider 36 will be disposed so as to subtend a resistance proportional to $r_p$.

To determine the internal plate resistance of any unknown tube 4, the latter would be substituted in the circuit for the said known tube 4, and the slider 36 would be adjusted until the meter 12 indicated the predetermined deflection. The internal plate resistance of the unknown tube 4 would then be read off on the calibrated scale of the voltage divider 38.

To compensate for changes in the characteristics of different amplifier tubes 30, where a calibrated voltage divider is used, a dummy resistor (not shown) could be substituted for the tube 4. The slider 36 could be moved to the proper reading to agree with the dummy resistor, and the amplification of the tube 30 could then be adjusted, by means of the variable resistor 48, so that the needle of the member 12 may be deflected to the corresponding point on the scale. The method of determining the internal plate resistance would otherwise be the same.

It is possible, also, to apply known, variable impressed voltages upon the output circuit of the tube 4 under test, without calibrating the voltage divider 38, for the readings of the meter 12 may be corrected by suitable calculations for such known, variable voltages. In fact, the use of known, variable impressed voltages is sometimes desirable, as both low-amplification and high-amplification tubes may then be measured with the same instrument 12. In such cases, furthermore, the instrument 12 may be provided with a plurality of differently graduated scales, each corresponding to a particular one of several impressed voltages upon the output circuit of the tube 4.

It is convenient to provide the apparatus with a local power source, such as an oscillator having a frequency of 1000 or 2000 cycles per second. This has two advantages, among others. First, the transformers, chokes and the like may then be more economically designed than when intended for use at 60 cycles; and secondly, the system is then usable even where standard 60-cycle frequencies are not available.

The tubes 4 may be conveniently connected in and out of circuit by means of a suitable socket or other receptacle (not shown) that is permanently connected in circuit.

Modifications will readily occur to persons skilled in the art, and all such are intended to be embraced within the appended claims.

What is claimed is:

1. A method of measuring the dynamic internal plate resistance of each of a plurality of space-current devices that comprises successively connecting the space-current devices with a common input circuit and a common output circuit, impressing a constant alternating voltage upon the output circuit, and measuring an alternating-current impulse of the output circuit.

2. A method of measuring the dynamic internal plate resistance of each of a plurality of space-current devices that comprises successively connecting the space-current devices with a common input circuit and a common output circuit, impressing a constant alternating voltage upon the output circuit, amplifying an alternating-current impulse of the output circuit, and measuring the amplified alternating-current impulse.

3. A method of measuring the dynamic internal plate resistance of each of a plurality of space-current devices that comprises successively connecting the space-current devices with a common input circuit and a common output circuit, impressing an alternating voltage upon the output circuit, adjusting the impressed voltage to produce a constant current in the output circuit, and measuring the adjusted impressed voltage.

4. A method of measuring the dynamic internal plate resistance of each of a plurality of space-current devices that comprises successively connecting the space-current devices with a common input circuit and a common output circuit, impressing an alternating voltage upon the output circuit, amplifying an alternating-current impulse of the output circuit, adjusting the impressed voltage to render the amplified alternating-current impulse constant, and measuring the adjusted impressed voltage.

5. Apparatus for measuring the dynamic internal plate resistance of each of a plurality of space-current devices having, in combination, a common input circuit and a common output circuit with which the space-current devices are adapted to be successively connected, means for impressing a constant alternating voltage upon the output circuit, and means for measuring an alternating-current impulse of the output circuit.

6. Apparatus for measuring the dynamic internal plate resistance of each of a plurality of space-current devices having, in combination, a common input circuit and a common output circuit with which the space-current devices are adapted to be successively connected, means for impressing a constant alternating voltage upon the output circuit, means for amplifying an alternating-current impulse of the output circuit, and means for measuring the amplified alternating-current impulse.

7. Apparatus for measuring the dynamic internal plate resistance of each of a plurality of space-current devices having, in combination, a common input circuit and a common output circuit with which the space-current devices are adapted to be successively connected, means for impressing an alternating voltage upon the output circuit, means for adjusting the impressed voltage to produce a constant current in the output circuit, and means for measuring the adjusted impressed voltage.

8. Apparatus for measuring the dynamic internal plate resistance of each of a plurality of space-current devices having, in combination, a common input circuit and a common output circuit with which the space-current devices are adapted to be successively connected, means for impressing an alternating voltage upon the output circuit, means for amplifying an alternating-current impulse of the output circuit, means for adjusting the impressed voltage to render the amplified alternating-current impulse constant, and means for measuring the adjusted impressed voltage.

9. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the alternating current in the output circuit, and means for measuring the voltage adjustably impressed upon the voltage divider.

10. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the voltage impressed upon the voltage divider, and means for measuring an alternating-current impulse of the output circuit.

11. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the alternating current in the output circuit, means for amplifying an alternating-current impulse of the output circuit, and means for measuring the voltage adjustably impressed upon the voltage divider.

12. Apparatus for measuring the dynamic internal plate resistance of each of a plurality of space-current devices having, in combination, a common input circuit and a common output circuit with which the space-current devices are adapted to be successively connected, a voltage divider in the output circuit, means for impressing an alternating voltage upon the voltage divider, means for adjusting the voltage divider to maintain constant the voltage impressed upon the voltage divider, means for amplifying an alternating-current impulse of the output circuit, and means for measuring the amplified alternating-current impulse.

13. Apparatus for measuring the dynamic internal plate resistance of each of a plurality of space-current devices having, in combination, a common input circuit and a common output circuit with which the space-current devices are adapted to be successively connected, the resistances in the output circuit being exceedingly small compared to the said dynamic internal plate resistance, means for impressing an alternating voltage upon the output circuit, and means for measuring an alternating-current impulse of the output circuit.

14. Apparatus for measuring the dynamic internal plate resistance of each of a plurality of space-current devices having, in combination, a common input circuit and a common output circuit with which the space-current devices are adapted to be successively connected, the resistances in the output circuit being small compared to the said dynamic internal plate resistance, means for impressing an alternating voltage upon the output circuit, means for rendering the impressed voltage constant, and means for measuring an alternating-current impulse of the output circuit.

15. Apparatus for measuring the dynamic internal plate resistance of each of a plurality of space-current devices having, in combination, a common input circuit and a common output circuit with which the space-current devices are adapted to be successively connected, the resistances in the output circuit being small compared to the said dynamic internal plate resistances, means for impressing an alternating voltage upon the output circuit, means for rendering the impressed voltage constant, an amplifier having an input circuit and an output circuit, means for connecting the amplifier input circuit with the output circuit of the first named space-current devices to amplify an alternating-current impulse, means for compensating for a dynamic characteristic of one of the space-current devices, and means for measuring an alternating-current impulse of the amplifier output circuit.

16. Apparatus for measuring the dynamic internal plate resistance of each of a plurality of space-current devices having, in combination, a common input circuit and a common output circuit with which the space-current devices are adapted to be successively connected, the impedance in the output circuit being of the same order of magnitude as the said dynamic internal plate resistance, means for impressing an alternating voltage upon the output circuit, and means for measuring an alternating-current impulse of the output circuit.

17. Apparatus for measuring the dynamic internal plate resistance of each of a plurality of space-current devices having, in combination, a common input circuit and a common output circuit with which the space-current devices are adapted to be successively connected, the impedance in the output circuit being of the same order of magnitude as the said dynamic internal plate resistance, means for impressing an alternating voltage upon the output circuit, means for rendering the impressed voltage constant, and means for measuring an alternating-current impulse of the output circuit.

18. Apparatus for measuring the dynamic internal plate resistance of each of a plurality of space-current devices having, in combination, a common input circuit and a common output circuit with which the space-current devices are adapted to be successively connected, the impedance in the output circuit being of the same order of magnitude as the said dynamic internal plate resistance, means for impressing an alternating voltage upon the output circuit, means for rendering the impressed voltage constant, an amplifier having an input circuit and an output circuit, means for connecting the amplifier input circuit with the output circuit of the space-current devices to amplify an alternating-current impulse of the output circuit of the space-current devices, and means for measuring the alternating-current impulse of the amplifier output circuit.

19. Apparatus for measuring the dynamic internal plate resistance of each of a plurality of space-current devices having, in combination, a common input circuit and a common output circuit with which the space-current devices are adapted to be successively connected, a transformer having a primary winding adapted to be connected with a source of alternating current and a secondary winding, means for connecting the output circuit with the secondary winding to cause the voltage of the source to become impressed upon the output circuit, and means for measuring an alternating-current impulse of the output circuit.

20. Apparatus for measuring the dynamic internal plate resistance of each of a plurality of space-current devices having, in combination, a common input circuit and a common output circuit with which the space-current devices are adapted to be successively connected, a transformer having a primary winding adapted to be connected with a source of alternating current and a secondary winding, means for connecting the output circuit with the secondary winding to cause the voltage of the source to become impressed upon the output circuit, an amplifier having an input circuit and an output circuit, means for connecting the amplifier input circuit with the output circuit of the space-current devices to amplify an alternating-current impulse of the output circuit of the space-current devices, and means for measuring the alternating-current impulse of the amplifier output circuit.

21. Apparatus for measuring the dynamic internal plate resistance of each of a plurality of space-current devices having, in combination, a common input circuit and a common output circuit with which the space-current devices are adapted to be successively connected, a transformer having a primary winding adapted to be connected with a source of alternating current and a secondary winding, an adjustable resistor connected with the secondary winding, means for connecting the output circuit with the resistor to cause the voltage of the source to become adjustably impressed upon the output circuit, means for adjusting the resistor to impress a constant voltage from the source upon the output circuit, an amplifier having an input circuit and an output circuit, means for connecting the amplifier input circuit with the output circuit of the space-current devices to amplify an alternating-current impulse of the output circuit of the space-current devices, and means for measuring the alternating-current impulse of the amplifier output circuit.

22. Apparatus for measuring the dynamic internal plate resistance of each of a plurality of space-current devices having, in combination, a common input circuit and a common output circuit, with which the space-current devices are adapted to be successively connected, means for impressing an alternating voltage upon the output circuit, a plurality of second space-current devices, a common input circuit and a common output circuit with which the second space-current devices are adapted to be successively connected, means for connecting the input circuit of the second space-current devices with the output circuit of the first-named space-current devices, means for compensating for differences in a dynamic characteristic of the second space-current devices, and means for measuring an alternating-current impulse of the output circuit of the second space-current devices.

23. Apparatus for measuring the resistances of each of a plurality of resistors having, in combination, a circuit having a substantially constant resistance, means for successively connecting the resistors into the circuit, means for impressing an alternating voltage upon the circuit, an amplifier having an input circuit and an output circuit, means for connecting the input circuit with the first-named circuit to amplify the voltage of the first-named circuit, means for compensating for a dynamic characteristic of the amplifier, and means for measuring the current of the output circuit.

24. A method of measuring the dynamic internal plate resistances of each of a plurality of space-current devices that comprises successively connecting the space-current devices with a common input circuit and a common output circuit, rendering the resistance in the output circuit exceedingly small compared to the said dynamic internal plate resistances, impressing an alternating voltage upon the output circuit, and measuring the current of the output circuit.

25. A method of measuring the dynamic internal plate resistances of each of a plurality of space-current devices that comprises successively connecting the space-current devices with a common input circuit and a common output circuit, rendering the resistance in the output circuit exceedingly small compared to the said dynamic internal plate resistances, impressing an alternating voltage upon the output circuit, amplifying the current of the output circuit, and measuring the amplified current.

26. Apparatus for measuring the dynamic internal plate resistance of each of a plurality of space-current devices having, in combination, a common input circuit and a common output circuit with which the space-current devices are adapted to be successively connected, means for impressing an alternating voltage upon the output circuit, means for indicating an alternating-current impulse of the output circuit, and means for adjusting the impressed alternating voltage to produce a constant indication of the indicating means, the adjusting means being calibrated in terms of the dynamic internal plate resistance.

27. Apparatus for measuring the dynamic internal plate resistance of each of a plurality of space-current devices having, in combination, a common input circuit and a common output circuit with which the space-current devices are adapted to be successively connected, means for impressing an alternating voltage upon the output circuit, an amplifier having an input circuit connected with the said output circuit and having also an output circuit, means for indicating an alternating-current impulse of the amplifier output circuit, a means for varying the impressed alternating voltage to produce a constant indication of the indicating means, the adjusting means being calibrated in terms of the said dynamic internal plate resistance.

EDWARD L. BOWLES.